United States Patent
Solberg, Jr. et al.

[11] Patent Number: 5,900,590
[45] Date of Patent: May 4, 1999

[54] CENTRIFUGAL MEASUREMENT OF MASS

[75] Inventors: Ruell Floyd Solberg, Jr., San Antonio; Richard Lorenz, Seguin, both of Tex.

[73] Assignee: Southwest Research Institute, San Antonio, Tex.

[21] Appl. No.: 08/888,161

[22] Filed: Jul. 3, 1997

Related U.S. Application Data

[60] Provisional application No. 60/024,298, Aug. 22, 1996.
[51] Int. Cl.⁶ .................. G01G 9/00; G01G 3/16
[52] U.S. Cl. .................. 177/1; 177/253; 73/580
[58] Field of Search .................. 177/1, 253, 264; 73/580, 861.351, 861.354, 865.3

[56] References Cited

U.S. PATENT DOCUMENTS

| | | | |
|---|---|---|---|
| 2,694,310 | 11/1954 | Pounds | 73/67 |
| 3,323,370 | 6/1967 | Green et al. | 73/432 |
| 3,492,858 | 2/1970 | Heflinger et al. | 73/67.2 |
| 3,555,886 | 1/1971 | Thornton | 73/67.2 |
| 3,565,193 | 2/1971 | Wirth | 177/1 |
| 3,800,893 | 4/1974 | Ramsay et al. | 177/25.11 |
| 3,805,904 | 4/1974 | Zimmerer | 177/1 |
| 3,834,474 | 9/1974 | Knol | 177/1 |
| 3,871,509 | 3/1975 | Kuster et al. | 177/1 |
| 3,926,271 | 12/1975 | Patashnick | 177/210 |
| 3,988,933 | 11/1976 | Fletcher et al. | 73/432 R |
| 4,158,395 | 6/1979 | Brown | 177/210 |
| 4,249,411 | 2/1981 | Pearson | 73/12 |
| 4,274,501 | 6/1981 | Gallo et al. | 177/210 FP |
| 4,391,338 | 7/1983 | Patashnick et al. | 177/210 FP |
| 4,405,024 | 9/1983 | Fraval et al. | 177/200 |
| 4,429,574 | 2/1984 | Barry et al. | 73/580 |
| 4,696,181 | 9/1987 | Rupprecht et al. | 73/580 |
| 4,838,371 | 6/1989 | Rupprecht et al. | 177/210 FP |
| 5,369,254 | 11/1994 | Kwon | 177/210 R |
| 5,442,960 | 8/1995 | Solberg, Jr. | 73/580 |

*Primary Examiner*—Randy W. Gibson
*Attorney, Agent, or Firm*—Baker & Botts, L.L.P.

[57] ABSTRACT

A method for measuring the masses of objects in any gravity environment, including microgravity or zero gravity. An object is placed on or attached to a platform or holder having a motor for rotating the platform. The object is rotated at an angular velocity and its centrifugal force is measured. Values representing the centrifugal force, the angular velocity, the tare mass of the platform, as well as a radial distance, are used to calculate the mass of the object. Three different variations of the method use different radial distance values.

23 Claims, 1 Drawing Sheet

CENTRIFUGAL MEASUREMENT OF MASS

RELATED PATENT APPLICATIONS

This application claims priority under 35 U.S.C. § 119(c)(1) of provisional application No. 60/024,298 filed Aug. 22, 1996.

GOVERNMENT RIGHTS CLAUSE

This invention was made with government support under Krug Life Sciences, Inc. purchase order number 5201. This purchase order was under a contract which Krug had with the National Aeronautics and Space Administration Johnson Space Center. The government has certain rights in the invention.

TECHNICAL FIELD OF THE INVENTION

This invention generally pertains to devices which measure the masses of objects. It more particularly relates to a device and method which can also be used in environments with gravity different from that on planet Earth.

BACKGROUND OF THE INVENTION

In terms of classical physics, "mass" is a measure of inertia, i.e., it is a measure of the opposition that a body offers to any attempts at changing its state of motion. The greater the mass of a body, the lower its acceleration under the action of an applied force. On Earth, the mass of a body can be determined by measuring its weight, where weight is the gravitational force acting on the body. If the acceleration due to Earth's gravity, a, and the weight, F, are known, the mass, m, can be determined from Newton's second law of motion, which in equation form is F=ma.

A problem with conventional methods of obtaining mass by measuring weight for some conditions is that they require gravity, that is, a condition of not being "weightless". In environments where the acceleration of gravity is apparently zero, such as in a spacecraft orbiting Earth, where it is zero, such as deep in intergalactic space, or where it is not the standard value, such as on the moon, some means for measuring mass other than the typical, conventional methods of measuring weight on Earth must be used. In classical physics, mass is defined such that a given body has a value that remains constant under all of the conditions described above.

Equipment is in use today for measuring mass under microgravity conditions, such as during space travel. One type of such equipment is a simple spring-mass system, wherein the object whose mass is to be measured is oscillated. The relationship between the mass of the object and the period of oscillation is used to obtain the mass value, using the principle that for a spring-mass oscillating system, the square of the period is related to the mass and the spring constant of the spring. A second type of such equipment imparts angular motion to a fluid by a rotary impeller in a housing. The rotation of the fluid creates centrifugal forces and fluid pressures. The centrifugal pressure is measured with a pressure transducer and converted to a mass value.

A third type of instrument to measure mass is through utilizing principles of angular simple harmonic motion. The object whose mass is to be measured is placed on a platform having torque restoring means. The platform is rotated from an equilibrium position and released, such that it undergoes angular simple harmonic motion. The period of oscillation is measured and used to calculate the mass of the object on the platform.

A problem with existing systems for measuring mass under microgravity conditions is that they require calibration using a large number of known masses over the measurement range. For example, reasonable approximations can be obtained with the spring-mass system if it is assumed to be a single degree of freedom oscillator and an ideal linear relationship exists between the square of the period of oscillation and the mass of the object. However, over even small mass ranges of the equipment, that relationship varies from the ideal sufficiently that errors prevent achieving consistently high accuracy. So, the variations from the ideal can be reduced by an increase of the number of calibration masses.

Similar problems exist for the rotary impeller system in that there are variations about the expected linear relationship between mass and pressure. Therefore, the rotary impeller system requires calibration for a set of masses over closely spaced intervals. In addition, calibration over the full mass range is required for accurate results. Recalibration is also required under some conditions. This consumes time, promotes errors, and requires availability of calibration masses. Budgeting of time and weight are important considerations for spaceflight missions.

The rotary impeller system also has the disadvantage of not being adaptable to measuring items other than liquids. It particularly is not well suited for measuring the masses of solid items, especially if they are large.

Also, the physical sizes of these types of systems for use in microgravity are large. Obviously, that is a negative factor for many situations where mass must be measured. One spring-mass system designed to operate in microgravity also requires significant additional equipment for it to be able to operate in a gravity environment as on Earth. Operation on Earth is very desirable for checkout, testing, and verification purposes.

The rotary impeller system is complex to operate and requires lengthy time interactions by the operator. The cycle time to perform a mass measurement is long. The equipment has difficulty removing all of a sample after a measurement, which will cause an error for the following sample measurement. It also has reduced accuracy for smaller samples. It has poor maintainability, repairability, and reliability.

The angular simple harmonic motion system has not received significant development and has not been tested or operated under microgravity conditions. This increases the risks of improper and inadequate operation.

SUMMARY OF THE INVENTION

To avoid the limitations and problems with other devices and methods, the objective of this invention is to measure the masses of objects, whether animal (including human), plant, or mineral under all gravity environments. The objects can be solid, semisolid, or liquid. In one embodiment, the object to be measured is placed on or attached to a platform, which is rotated. The object is secured to the platform during the rotation. A force sensor, such as a load cell, is placed between the object and an obstruction at the outer perimeter of the platform, and the centrifugal force exerted by the object is measured during the platform rotation.

The centrifugal force, the tare mass, the angular velocity, and a radial distance value are used to calculate the mass of the object. Two variations of the method use different radial distance values: the effective distance of the tare mass and the object from the center of rotation or the distance of only the object from the center of rotation. A third variation of the method involves placing the object at a different radial position, remeasuring the centrifugal force, and using difference values of force and radial distance to calculate the mass.

A technical advantage of the invention is that it may be used to measure the masses of objects in any gravitational field, including in microgravity during space travel. The device can measure the masses of liquid or semi-solid materials, which tend to slosh in their containers, and avoids measurement error resulting from that characteristic. Also, liquids can be measured in any container without transfer to another chamber or housing of the device. The device is tolerant of changes in the tare mass (the mass of the platform or container and associated items). If such changes occur, the tare mass can simply be remeasured with an empty platform or container.

DETAILED DESCRIPTION OF THE INVENTION

Figure 1:
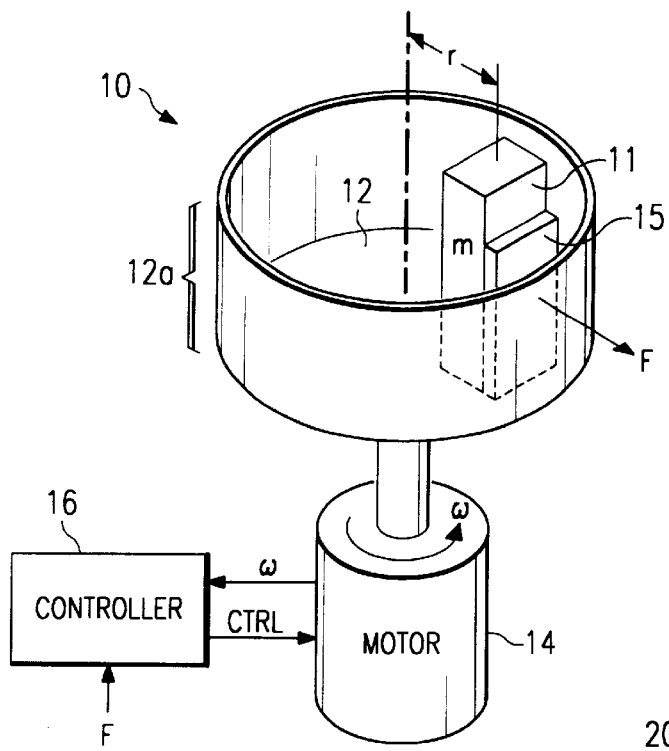
FIG. 1 illustrates a device for determining the mass of an object.

FIG. 1 illustrates a device 10 for determining the mass, m, of an object 11. The invention is directed to the use of device 10 to determine mass from measurements of centrifugal force, F, angular velocity, ω, and radial dimension, r.

Object 11 is mounted on a rotatable platform 12, at the outer perimeter of platform 12. The distance from the center of gravity of object 11 to the center of rotation of platform 12 is r.

Object 11 is mounted on platform 12 in a manner such that object 11 is positioned properly and will not come loose from platform 12 when it rotates. Straps, clamps, tracks, or any variety of means (not shown) can be used for this purpose, and the preferred type will depend upon the shape, size, and other external characteristics of object 11. In microgravity conditions, object 11 is attached in a manner that prevents it from floating away. A perforated rubber cover works well when object 11 has an irregular shape.

Force sensor 15 measures the centrifugal force, F, of object 11 when platform 12 is rotating. Any type of force sensor 15 that measures compressive force may be used, for example, a load cell. Multiple force sensors 15 can be stacked (mounted serially) to provide improved sensitivity and accuracy and to increase the range of measuring capacity.

In FIG. 1, platform 12 is shown with a raised side 12a at its outer diameter. This permits force sensor 15 to be placed between object 11 and the raised side. Raised side 12a completely encircling platform 12, as shown in FIG. 1, is not required for all possible configurations. Force sensor 15 can also be attached to the platform base, as with a bracket, or to a segment of the raised side. Object 11 is positioned on platform 12 and force sensor 15 such that the centrifugal force of object 11 is measured when platform 12 rotates.

In general, platform 12 may be any shape or size, with a common characteristic being that it provides a means to couple object 11 to a motor 14 that provides rotational motion for object 11. It should also be understood that instead of a platform 12, a rotatable arm with a means for holding object 11 at a distance from the center of rotation, could be used. Regardless of whether a platform or arm or some other structure is used, the primary characteristic of the structure is that it be a rotatable holder for object 11, that it have a force sensor 15, and that it hold object 11 in a manner that permits force sensor 15 to measure the centrifugal force of object 11 during rotation.

Motor 14 rotates platform 12 at an angular velocity, ω. Device 10 is insensitive to extraneous forces or accelerations in directions perpendicular to the plane of rotation. The rotation of platform 12 can be such that its acceleration can be of any form, e.g., constant, impulsive, linearly increasing or linearly decreasing. The angular velocity can be varied to improve operational characteristics. For example, slower rotational speeds can be used to decrease the centrifugal forces so that heavier objects can be measured.

As explained below, the method of the invention uses the value of the angular velocity, ω, to compute the mass, m, of object 11. In the example of FIG. 1, this value is provided by motor 14. Various means for obtaining a present value of the angular velocity can be used, such as a position sensor that uses a beam of light to sense revolutions of platform 12. A timer can be used to measure the period per revolution, and this value can be used by controller 16 to determine the angular velocity.

Controller 16 monitors and controls the operation of device 10, including the angular velocity and forces measured by force sensor 15. Controller 16 may include memory and a programmable processor for storing and executing programming that uses the values of angular velocity, centrifugal force, and tare mass, as well as a radial distance value, to calculate the mass of object 11. Three variations of a method of calculating mass in this manner are described below. The three methods use radial distance values of r, $r_t$, or Δr. In the latter method, object 11 is radially repositioned on platform 12, in which case controller 16 can control this motion.

Controller 16 monitors F and ω so it can use values that are instantaneous or integrated over time, as desired. Values that are integrated over time are "smoothed" because the effects of extraneous forces or minor speed variations are reduced. On the other hand, instantaneous values reduce the time that such extraneous forces or speed variations can affect measured values.

Device 10 can be operated in a simplified manner without controller 16. Then, the outputs of force sensor 15 and the angular velocity are measured, and the calculations performed externally to device 10, manually or with a calculator. The radial movement of platform 12, used for one of the techniques described below, can also be performed manually.

Figure 2:
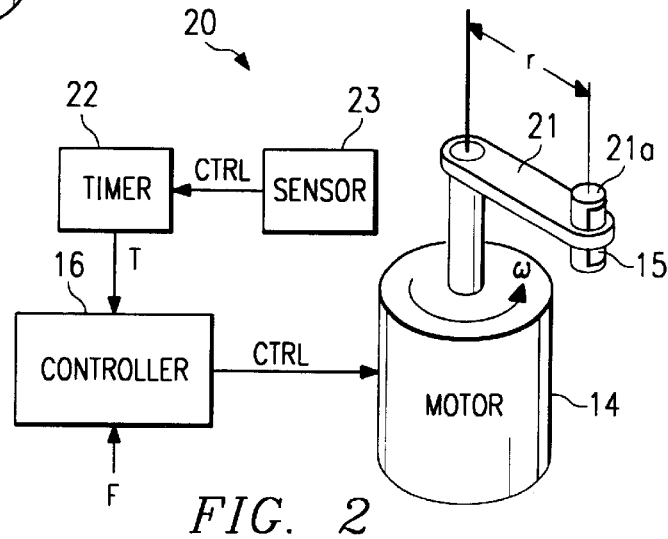
FIG. 2 illustrates a functional equivalent of the device of FIG. 1, but with a rotatable arm instead of a platform, a container for holding objects that are non-solid (granular, powder, or liquid), and a position sensor and timer for determining angular velocity.

FIG. 2 illustrates a device 20 that is the functional equivalent of device 10, having a rotatable arm 21 for holding the object whose mass is to be measured. The arm 21 can have a container 21a at its rotating end, in which object 11 if non-solid (e.g., powder, liquid, or granular) may be placed. Force sensor 15 may be anywhere along rotatable arm 21. However, the tare mass will be reduced as it is moved closer to object 11. A position sensor 23 detects a marker on arm 21 and sends start and stop signals to a timer 22, which measures the time, T, per revolution. This data is delivered to controller 16, which computes angular velocity.

Using Newton's second law of motion and an equation for radial acceleration for circular motion, the general form for centrifugal force is $$F = m\omega^2 r. \quad (1)$$

For object 11 mounted on platform 12, the total mass of the object 11 plus a tare mass (of platform 12 and associated items) may be expressed as m+m$_t$. If r equals the effective distance from the center of rotation to the centers of gravity for object 11 and the tare mass, the centrifugal force is $$F = (m+m_t)\omega^2 r. \quad (2)$$

If equation (2) is reordered for the mass of object 11, $$m = \frac{F}{\omega^2 r} - m_t. \quad (3)$$

If the effective distance from the center of rotation to the center of gravity of object 11 is separated from the remainder of the system, Equation (2) becomes $$F = (m+m_t r_t)\omega^2, \quad (4)$$

where r$_t$ is the effective center of gravity distance for the system without object 11. Then, $$m = \frac{1}{r}\left[\frac{F}{\omega^2} - m_t r_t\right]. \quad (5)$$

Figure 3:
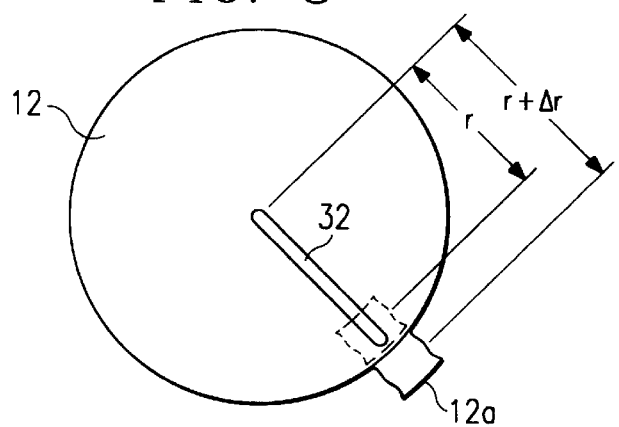
FIG. 3 illustrates the device of FIG. 1, but with a platform that permits the object to be radially repositioned.

FIG. 3 illustrates schematically, a radial displacement of object 11 on platform 12 by an amount Δr. The change in radial position of object 11 can be achieved by using a track 32, along which the raised side 12a of platform 12 is moveable.

If the angular velocity is the same as earlier (before Δr movement), then from Equation (4), the centrifugal force at the Δr radial position is $$F_{\Delta r} = [m(r+\Delta r) + m_t (r_t + \Delta r)]\omega^2. \quad (6)$$

If ΔF is the difference between the centrifugal forces of Equations (2) and (6), then $$\Delta F = F_{\Delta r} - F = (m + m_t)\omega^2 (\Delta r) \quad (7)$$

and $$m = \frac{\Delta F}{\omega^2 (\Delta r)} - m_t. \quad (8)$$

The above discussion is the basis for three techniques for determining the mass of object 11. Each technique uses angular velocity and centrifugal force measurements to calculate the mass in accordance with one of the above equations.

A first technique uses Equation (3). Object 11 is rotated at a known or measured angular velocity. The centrifugal force is measured, and the effective distance from the center of rotation to the combined centers of gravity of object 11 and the tare mass is determined. The tare mass can be determined by operating device 10 without object 11, such that m=0 in Equation (3).

A second technique uses Equation (5) and eliminates the need for determining an effective distance from the center of rotation for the combination of masses. The tare mass distance, r$_t$, can be determined through calibration of device 10.

The third technique uses Equation (8), and eliminates the need to determine the distances from the center of rotation to a center of gravity entirely. Part or all of platform 12 is moved a measured or specific amount, Δr, radially. This radial movement can be away from or toward the center of rotation. The radial movement can be provided mechanically by one or more stepper motors, by one or more lead or ball screws driven by one or more motors, by hydraulic or fluid actuators, by one or more release and latch mechanisms, or by other means. Absolute values of the centrifugal forces are not required—only the differences of the centrifugal forces for the two positions of platform 12 are used.

The tare mass for the third technique can be determined by performing measurements with an empty platform 12 at its "normal" position and at a position displaced by Δr. The unknown mass, m, of Equation (8) is 0 for this.

The third technique can also be used by moving the object 11 on platform 12 by a radial distance Δr, without moving platform 12. For this method, the operator moves object 11 to the new location on platform 12, using holes, pins, stops, or the like, to secure object 11 in each position. This method may be less accurate than the method that moves platform 12, but device 10 is simplified.

The tare mass value, m$_t$, can be updated whenever there is concern about it being correct. This is done with the empty platform measurements described above. Device 10 can be programmed to perform an empty platform measurement before each measurement of object 11 is performed or at predetermined intervals. An advantage of this feature is that the tare mass is not required to remain constant. One or more calibration masses, whose values are known, can also be used to determine the tare mass.

Device 10 can also be designed or programmed to perform repeated measurements, such as with different angular velocities or, in the case of Equation (8), with additional radial displacements of object 11. These additional measurements can be used to verify other measurements, to obtain statistical data of the mass of object 11, or for other reasons. Device 10 can use the data to perform statistical analysis about the unknown mass, which may be beneficial when high accuracy is desired.

Although not shown in FIG. 1, counterbalancing weights can be attached to platform 12 at locations opposite to object 11 from the center of rotation to reduce the effects of vibration and forces on bearings and other mechanical parts. This may be of greater importance for higher speeds of rotation or for larger masses of platform 12 and/or object 11. The radial position of a counterbalancing weight can also be varied as a function of the mass of object 11. This would prevent the need for different counterbalancing weights for different masses.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A device for determining the mass of an object, comprising:

a holder for the object whose mass is to be determined, said holder being rotatable in a plane of rotation and having a surface perpendicular to said plane of rotation, said holder having means for holding said object, and having a tare mass;

a force sensor positioned against said perpendicular surface for measuring centrifugal force of said object when said holder and said object are rotated;

a motor for rotating said holder at an angular velocity; and a controller in data communication with said force sensor, said controller having programs for calculating said mass, and having memory for storing values representing centrifugal force measured by said load cell at a first radial position on said platform and at a second radial position on said platform, said tare mass, said angular velocity, and a value representing a radial displacement of said object from said first radial position to said second radial position, said values used by said controller for said calculating of said mass.

2. The device of claim 1 wherein said holder is a platform having an outer perimeter to which said force sensor and said object are attached.

3. The device of claim 1, wherein said holder is an arm having a rotating end to which said object is attached.

4. The device of claim 1, wherein said object is in a non-solid state and wherein said holder has a container for said object.

5. The device of claim 1, wherein said motor is a variable speed motor.

6. The device of claim 1, wherein said motor provides a signal representing said angular velocity to said controller.

7. The device of claim 1, further comprising a position sensor proximate to said holder, and a timer in data communication with said position sensor and said controller, and wherein said controller obtains said value representing angular velocity from rotation period information provided by said timer.

8. The device of claim 1, wherein said holder has means for radially repositioning said object on said holder.

9. The device of claim 1, wherein said object is radially repositionable.

10. A method of determining the mass of an object, comprising the steps of:

rotating said object at an angular velocity around a center of rotation at a first radial distance from said center of rotation, using a rotating holder having a tare mass;

measuring said angular velocity;

measuring the centrifugal force of said object as said object rotates, thereby obtaining a first centrifugal force value;

repositioning said object to a second radial distance from said center of rotation;

repeating said rotating and said measuring steps, thereby obtaining a second centrifugal force value; and calculating said mass of said object, using said data and values representing said angular velocity, said tare mass, said first centrifugal force value, said second centrifugal force value, and the difference of said first radial distance and said second radial distance.

11. The method of claim 10, wherein said calculating step is performed by solving the following equation $$m = \frac{\Delta F}{\omega^2(\Delta r)} - m_t$$

where m is said mass of said object, $\Delta F$ is the difference between said first centrifugal force value and said second centrifugal force value, $\omega$ is said angular velocity, $\Delta r$ is the difference between said first radial distance and said second radial distance, and $m_t$ is said tare mass.

12. The method of claim 10, wherein said calculating step is performed by a computer.

13. The method of claim 12, wherein said data representing said first centrifugal force and said second centrifugal force are automatically delivered to said computer.

14. The method of claim 10, wherein said rotating step is performed with a motor that delivers said value representing said angular velocity to said computer.

15. The method of claim 10, further comprising the step of measuring the period of one revolution of said object and calculating known angular velocity from said period.

16. The method of claim 10, wherein said delivering step is repeated over time and further comprising the step of integrating said data over time before said calculating step.

17. A device for determining the mass of an object, comprising:

a holder for the object whose mass is to be determined, said holder being rotatable in a plane of rotation and having a surface perpendicular to said plane of rotation, said holder having means for holding said object, and having a tare mass;

a force sensor positioned against said perpendicular surface for measuring centrifugal force of said object when said holder and said object are rotated;

a motor for rotating said holder at an angular velocity; and means for radially repositioning said object on said holder.

18. The device of claim 17, where in said holder is a platform having an outer perimeter to which said force sensor and said object are attached.

19. The device of claim 17, where in said holder is an arm having a rotating end to which said object is attached.

20. The device of claim 17, wherein said object is in a non-solid state and wherein said holder has a container for said object.

21. The device of claim 17, wherein said motor is a variable speed motor.

22. The device of claim 17, wherein said motor provides a signal representing said angular velocity to said controller.

23. The device of claim 17, further comprising a position sensor proximate to said holder, and a timer in data communication with said position sensor and said controller, and wherein said controller obtains said value representing angular velocity from rotation period information provided by said timer.

* * * * *

UNITED STATES PATENT AND TRADEMARK OFFICE
CERTIFICATE OF CORRECTION

PATENT NO. : 5,900,590
DATED : May 4, 1999
INVENTOR(S) : Ruell F. Solberg, Jr.

It is certified that error appears in the above-identified patent and that said Letters Patent is hereby corrected as shown below:

Col. 5, line 31 -- delete "Ar" and insert -- $\Delta r$ --.

Col. 5, line 38 -- delete "$F=\Delta r$" and insert -- $F\Delta r$ --.

Claim 18, col. 8, line 38, -- delete "where in" and insert -- wherein --.

Claim 19, col. 8, line 41, -- delete "where in" and insert -- wherein --.

Signed and Sealed this

Twenty-eighth Day of March, 2000

Attest:

Q. TODD DICKINSON

*Attesting Officer*  *Commissioner of Patents and Trademarks*